United States Patent
Maeda

(10) Patent No.: US 7,190,572 B2
(45) Date of Patent: Mar. 13, 2007

(54) CAPACITOR ELEMENT OF SOLID ELECTROLYTIC CAPACITOR, METHOD OF MAKING THE CAPACITOR ELEMENT, AND SOLID ELECTROLYTIC CAPACITOR USING THE CAPACITOR ELEMENT

(75) Inventor: Takahiro Maeda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 24 days.

(21) Appl. No.: 10/521,918

(22) PCT Filed: Jul. 18, 2003

(86) PCT No.: PCT/JP03/09212

§ 371 (c)(1),
(2), (4) Date: Jan. 20, 2005

(87) PCT Pub. No.: WO2004/010446

PCT Pub. Date: Jan. 29, 2004

(65) Prior Publication Data

US 2005/0231895 A1 Oct. 20, 2005

(30) Foreign Application Priority Data

Jul. 24, 2002 (JP) .............................. 2002-214944

(51) Int. Cl.
*H01G 9/00* (2006.01)
(52) U.S. Cl. ...................... 361/528; 361/523; 361/525; 361/529; 361/534; 29/25.03
(58) Field of Classification Search ........ 361/302–504, 361/508–512, 523–534; 29/25.03, 25.01
See application file for complete search history.

(56) References Cited

U.S. PATENT DOCUMENTS

| 5,461,538 A | * | 10/1995 | Kuriyama | 361/523 |
| 5,483,415 A | * | 1/1996 | Nakamura et al. | 361/529 |
| 5,959,831 A | * | 9/1999 | Maeda et al. | 361/523 |
| 6,430,033 B1 | * | 8/2002 | Mitsui et al. | 361/525 |

FOREIGN PATENT DOCUMENTS

JP    07-066079 A    3/1995
JP    2000-348985 A  12/2000

* cited by examiner

*Primary Examiner*—Nguyen T. Ha
(74) *Attorney, Agent, or Firm*—Hamre, Schumann, Mueller & Larson, P.C.

(57) ABSTRACT

An object of the invention is to provide a capacitor element capable of reducing product defects caused in the process step of forming a cathode electrode film and capable of reducing the size and weight of a solid electrolytic capacitor incorporating the capacitor element. The capacitor element includes an anode chip body including a porous sintered body formed by sintering valve metal powder into a rectangular parallelepiped, an anode wire fixed to a first end surface of the anode chip body, a dielectric film formed on the metal powder of the anode chip body, a solid electrolyte layer formed on the dielectric film, and a cathode-side electrode film formed on the anode chip body via the solid electrolyte film. The object is achieved by rounding or chamfering at least two of four edges of the anode chip body at which four side surfaces of the anode chip body meet a second end surface which is opposite from the first end surface, the two edges being parallel with each other.

4 Claims, 8 Drawing Sheets

CAPACITOR ELEMENT OF SOLID ELECTROLYTIC CAPACITOR, METHOD OF MAKING THE CAPACITOR ELEMENT, AND SOLID ELECTROLYTIC CAPACITOR USING THE CAPACITOR ELEMENT

BACKGROUND OF THE INVENTION

The present invention relates to a solid electrolytic capacitor utilizing valve metal such as tantalum, niobium or aluminum, for example. The invention particularly relates to a capacitor element used for such a capacitor, a method of making such a capacitor element, and a solid electrolytic capacitor using such a capacitor element.

Conventionally, a capacitor element for use in the above kind of solid electrolytic capacitor is manufactured by such a method as disclosed in JP-A 7-66079, for example. This method comprises the following process steps.

(1) As shown in FIG. 1, powder of valve metal such as tantalum is compacted into a porous parallelepiped anode chip body 2 so that an anode wire 3 projects from a first end surface 2a of the porous chip body 2. Then, the anode chip body is sintered.

(2) Subsequently, the anode chip body 2 is subjected to anodizing. Specifically, direct current is applied, with the anode chip body immersed in a chemical solution such as an aqueous solution of phosphoric acid. As a result, a dielectric film of e.g. tantalum pentoxide is formed on each metal particle of the anode chip body.

(3) Subsequently, as shown in FIG. 1, the anode chip body 2, with the anode wire 3 oriented upward, is immersed into an electrolyte solution A such as an aqueous solution of manganese nitrate so that the electrolyte solution A infiltrates into the porous structure of the anode chip body 2. Thereafter, the anode chip body 2 is pulled out from the electrolyte solution A, and dried and baked. These process steps are repeated a plurality of times. As a result, as shown in FIGS. 2 and 3, a solid electrolyte layer 4 made of metal oxide such as manganese dioxide is formed at the surfaces of the anode chip body 2 via the dielectric film.

(4) Subsequently, a graphite layer is formed at the surfaces of the anode chip body 2 except the end surface 2a.

(5) Then, with the anode wire 3 oriented upward again, the anode chip body 2 is immersed in a metal paste such as silver paste and then pulled out and baked. As a result, as shown in FIG. 4, a cathode electrode film 5 of the metal paste is formed at the surfaces of the anode chip body 2 except the first end surface 2a.

In this way, a capacitor element 1 is manufactured.

However, in the process step for forming a solid electrolyte layer 4 of metal oxide such as manganese dioxide on the anode chip body 2 via the dielectric film, when the anode chip body 2 is pulled out of the electrolyte solution A, an excess of the electrolyte solution caused to infiltrate into the porous structure of the anode chip body 2 drips from a second end surface 2b, i.e. the lower end surface of the anode chip body 2.

When the excess of the electrolyte solution drips from the second end surface 2b of the anode chip body 2, part of the solution gathers to form droplets, by surface tension, at all of four corner edges 2c', 2d', 2e' and 2f' of the anode chip body 2 where four side surfaces 2c, 2d, 2e and 2f meet the second end surface 2b. Since the anode chip body is dried and baked in this state, the solid electrolyte layer 4 formed by the above step includes outwardly projecting bumps at all the four corner edges 2c', 2d', 2e' and 2f' surrounding the second end surface 2b while recessing at the center of the second end surface 2b, as shown in FIGS. 2 and 3.

In this way, the bumps 4' of the solid electrolyte layer 4 surrounds the second end surface 2b of the anode chip body 2 along the entire periphery of the end surface. Following the above step, after a graphite layer is formed on the anode chip body 2, the anode chip body 2 is immersed in a metal paste such as a silver paste with the anode wire 3 oriented upward and then baked for forming a cathode-side electrode film 5, as shown in FIG. 4. However, when the anode chip body 2 is immersed in a metal paste in the step of forming a cathode-side electrode film, air cannot escape from the recessed portion of the solid electrolyte layer 4 at the second end surface 2b. Therefore, a void is formed due to the trapping of an air bubble 6, which probably causes a defect in the product.

When the cathode-side electrode film 5 is formed to overlap the solid electrolyte layer 4, the cathode-side electrode film 5 also bulges at the four corner edges 2c', 2d', 2e' and 2f' to form bumps 5' overlapping the bumps 4' of the solid electrolyte layer 4.

In this way, the solid electrolyte layer 4 and the cathode-side electrode film 5 are bulged to form bumps 4' and 5' at all of the corner edges 2c', 2d', 2e' and 2f' surrounding the second end surface 2b of the capacitor element 1. The capacitor element 1 is thereafter disposed between an anode lead terminal and a cathode lead terminal so that the anode wire 3 is connected to the anode lead terminal while the cathode-side electrode film 5 is connected to the cathode lead terminal, and the entirety is sealed in a package to provide a complete package-type solid electrolytic capacitor. However, the height and width of the package need be increased by as much as the dimension of the bumps 4' and 5' formed at the corner edges 2c', 2d', 2e' and 2f' surrounding the second end surface 2b of the anode chip body, whereby the size and weight of the capacitor is disadvantageously increased.

DISCLOSURE OF THE INVENTION

An object of the present invention is to provide a capacitor element capable of solving the above-described problems without reducing the capacitance of a capacitor and to provide a method for making such a capacitor element and a solid electrolytic capacitor utilizing such a capacitor element.

To achieve the above object, the present invention provides a capacitor element comprising: an anode chip body including a porous sintered body formed by sintering valve metal powder into a rectangular parallelepiped having four side surfaces, a first end surface and a second end surface which is opposite from the first end surface, and an anode wire fixed to the first end surface; a dielectric film formed on the metal powder of the anode chip body; a solid electrolyte layer formed on the dielectric film; and a cathode-side electrode film formed on the anode chip body via the solid electrolyte film. In the capacitor element, at least two of four edges of the anode chip body at which the four side surfaces meet the second end surface are rounded or chamfered, the two edges being parallel with each other.

A method of making a capacitor element according to the present invention comprises the steps of: preparing an anode chip body including a porous sintered body formed by sintering valve metal powder into a rectangular parallelepiped having four side surfaces, a first end surface and a second end surface which is opposite from the first end surface, and an anode wire fixed to the first end surface, the anode chip body being so formed that at least two of four edges at which the four side surfaces meet the second end surface are chamfered or rounded, the two edges being parallel with each other; forming a dielectric film on the metal powder of the anode chip body; forming a solid electrolyte layer by immersing the anode chip body in an electrolyte solution with the anode wire oriented upward, pulling the anode chip body from the solution followed by baking the anode chip body; and forming a cathode-side electrode film of a metal paste on the anode chip body via the solid electrolyte layer.

A solid electrolytic capacitor according to the present invention comprises an anode lead terminal plate, a cathode lead terminal plate, and a capacitor element arranged between the anode lead terminal plate and the cathode lead terminal plate; the capacitor element comprising an anode chip body including a porous sintered body formed by sintering valve metal powder into a rectangular parallelepiped having four side surfaces, a first end surface and a second end surface which is opposite from the first end surface, and an anode wire fixed to the first end surface, a dielectric film formed on the metal powder of the anode chip body, a solid electrolyte layer formed on the dielectric film, and a cathode-side electrode film formed on the anode chip body via the solid electrolyte film; the anode wire of the capacitor element being fixed to the anode lead terminal plate, the cathode-side electrode film being electrically connected to the cathode lead terminal plate. At least two of four edges of the anode chip body at which the four side surfaces meet the second end surface are rounded or chamfered, the two edges being parallel with each other.

In this way, of the four edges at which the four side surfaces meet the second end surface of the anode chip body, at least two edges which are parallel with each other are rounded or chamfered. Therefore, in the above step for forming a solid electrolyte layer on the anode chip body via the dielectric film, when the anode chip body is pulled out from the electrolyte solution, the electrolyte solution dripping from the second, or the lower end surface of the anode chip body gathers to form droplets only at the remaining two of the four edges surrounding the second end surface, i.e. at the two corner edges which are not rounded nor chamfered. The electrolyte solution does not gather to form droplets at the two rounded or chamfered edges. Accordingly, the solid electrolyte layer formed on the anode chip body is reliably prevented from bulging to form bumps at the two edges which are rounded or chamfered.

Specifically, the electrolyte layer formed on the anode chip body bulges into bumps only at two edges, which are parallel with each other, of the four edges surrounding the second end surface. Therefore, at the second end surface of the anode chip body, the electrolyte layer is prevented from being surrounded by the outwardly projecting bumps along the entire periphery of the end surface. Therefore, when the anode chip body is subsequently immersed in a metal paste such as a silver paste for forming a cathode-side electrode film, air at the second end surface of the anode chip body can easily escape. Therefore, trapping of air at that portion is less likely to occur, whereby the formation of a void due to the trapping of an air bubble can be prevented in forming the cathode electrode film of a metal paste such as a silver paste. Therefore, the production of a defective capacitor element is reliably reduced.

Further, of the four edges surrounding the second end surface of the anode chip body, the formation of the outward bumps of the solid electrolyte layer and the cathode-side electrode film can be limited to the corner edges other than at least two edges which are rounded or chamfered. Therefore, when the capacitor element is assembled into a packaged-type solid electrolytic capacitor as will be described in the description of embodiments, either the height or width of the package-type solid electrolytic capacitor can be reduced by as much as the dimension of the bumps of the solid electrolyte layer and the cathode-side electrode film which do not project from at least two rounded or chamfered edges of the anode chip body. As a result, the size and weight of the solid electrolytic capacitor can be reduced.

Particularly, when only two edges are rounded or chamfered as set forth in Claim 2, a reduction in the volume of the anode chip can be suppressed as compared with the case where all of the four edges are rounded or chamfered, whereby a large reduction in the capacitance of the capacitor element can be prevented.

Moreover, when the structure as set forth in Claim 5 is employed, the bumps of the solid electrolyte layer and the cathode-side electrode film formed at the second end surface of the capacitor element are prevented from coming into contact with the cathode-side lead terminal plate. Therefore, damage to the bumps such as chipping off of the bumps can be reliably prevented, and the cathode lead film can be electrically connected to the cathode-side lead terminal plate reliably.

DETAILED DESCRIPTION OF THE PREFERRED EMBODIMENTS

Preferred embodiments of the present invention will be described below with reference to the accompanying drawings (FIGS. 5–13) showing a capacitor element for a tantalum solid electrolytic capacitor according to the present invention.

Figure 5:
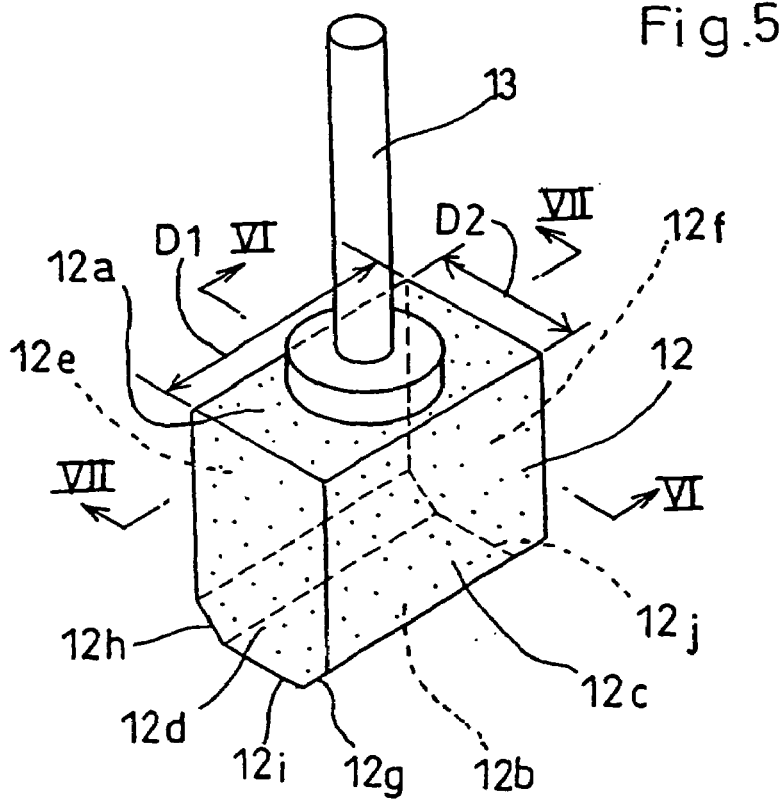
FIG. 5 is a perspective view showing an anode chip body of a capacitor element according to the present invention.

FIG. 5 shows an anode chip body 12 formed by compacting tantalum powder into a rectangular parallelepiped followed by sintering. The anode chip 12 includes a first end surface 12a to which an anode wire 13 made of tantalum is fixed to project therefrom.

The anode chip body 12 is rectangular with a longer side D1 and a shorter side D2 in a cross section perpendicular to the anode wire 13 and has a height L.

Figure 6:
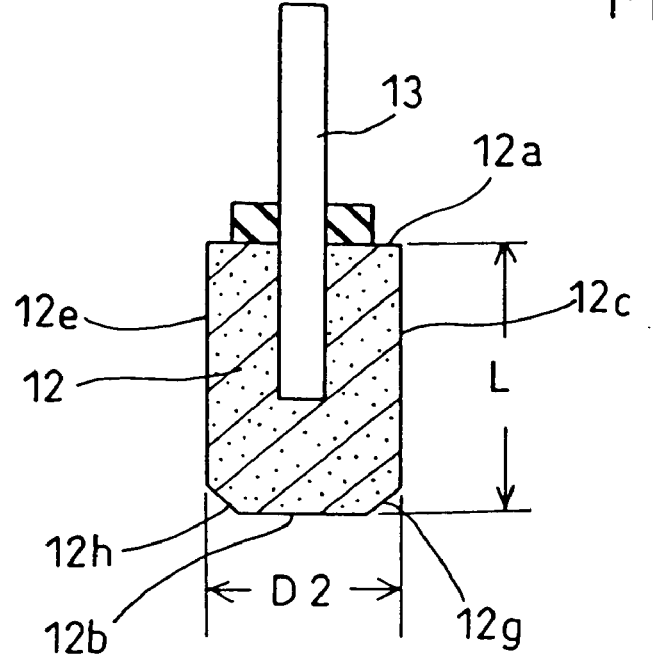
FIG. 6 is a sectional view taken along lines VI—VI in FIG. 5.
Figure 7:
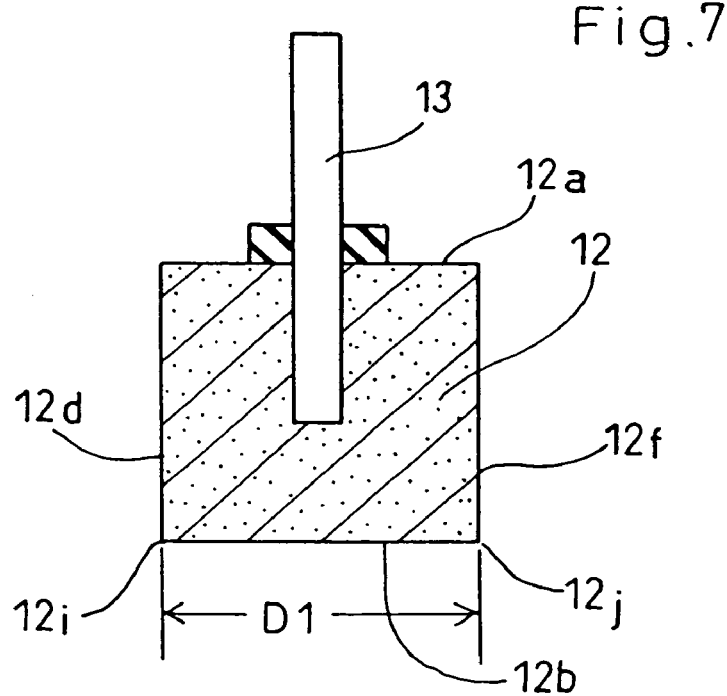
FIG. 7 is a sectional view taken along lines VII—VII in FIG. 5.
Figure 8:
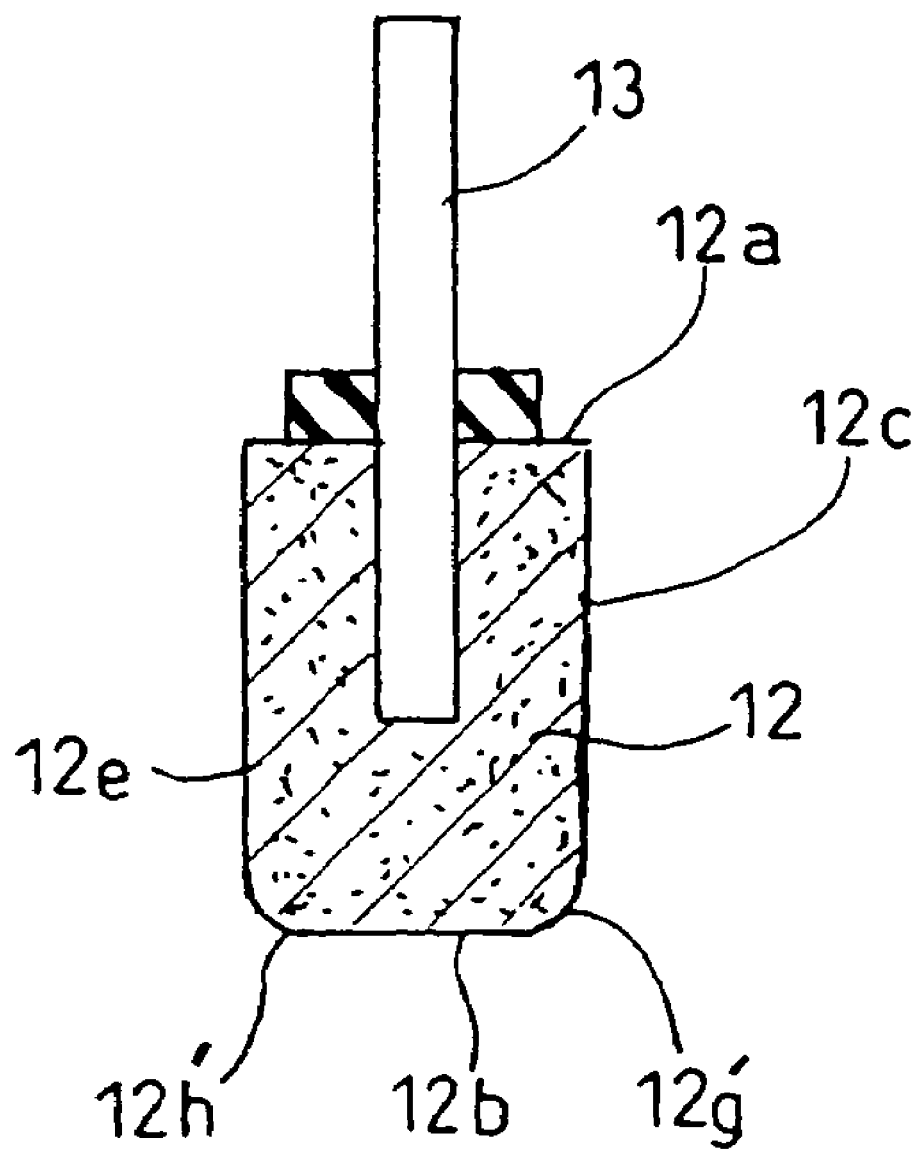
FIG. 8 is a perspective view showing another example of anode chip body of a capacitor element according to the present invention.

In forming the anode chip body 12 by compacting, the two ridge lines, i.e., corner edges where the opposite pair of larger side surfaces 12c and 12e of the four side surfaces 12c, 12d, 12e and 12f of the anode chip body meet a second end surface 12b which is opposite from the first end surface 12a are chamfered to provide beveled surfaces 12g and 12h, as shown in FIGS. 5 and 6, or rounded to provide rounded surfaces 12g' and 12h', as shown in FIG. 8.

Similarly to the prior art method, the anode chip body 12 is subjected anodizing, i.e., subjected to direct current application with the anode chip body immersed in a chemical solution such as an aqueous solution of phosphoric acid. As a result, a dielectric film of e.g. tantalum pentoxide is formed on each metal particle of the anode chip body 12.

Figure 1:
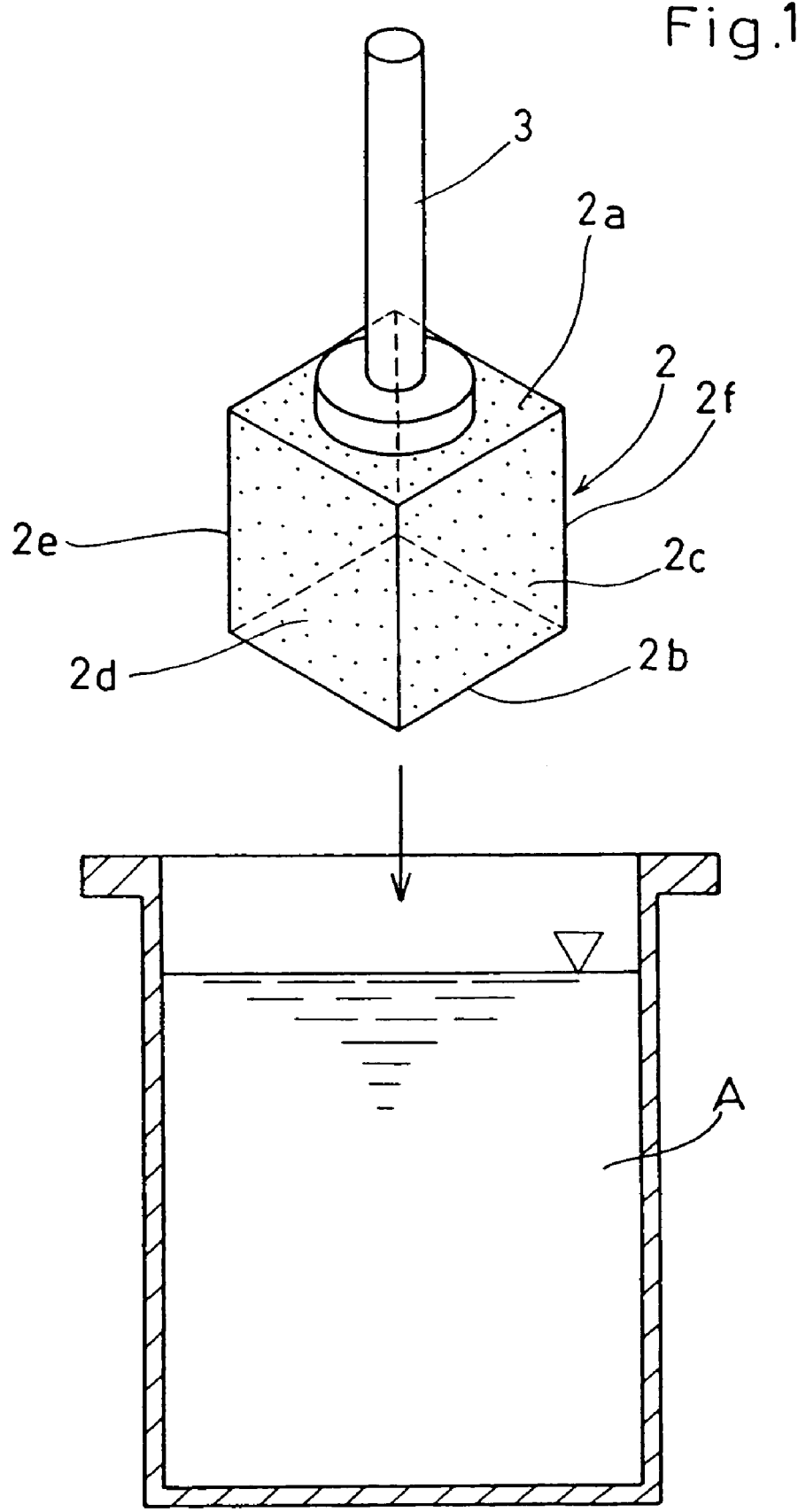
FIG. 1 is a perspective view showing an anode chip body of a prior art capacitor element.
Figure 2:
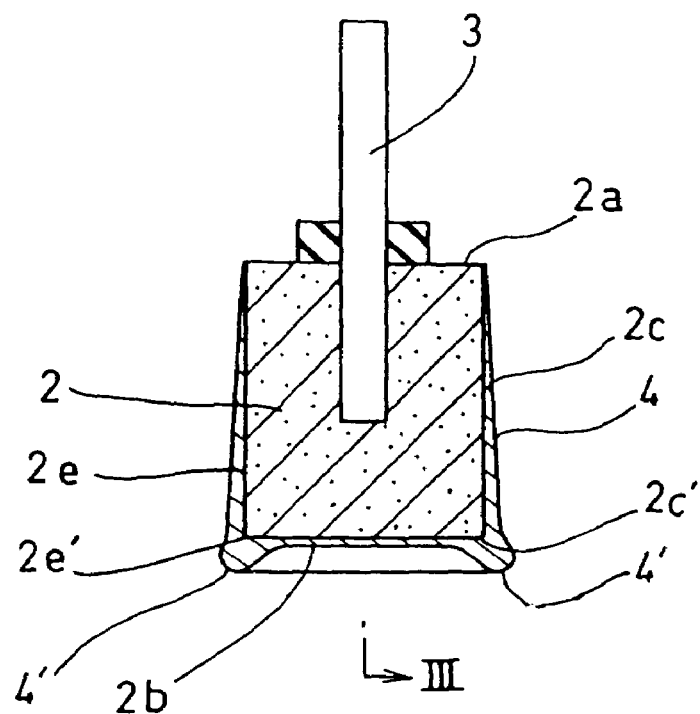
FIG. 2 is a longitudinal sectional view showing the prior art anode chip body on which a solid electrolyte layer is formed.
Figure 3:
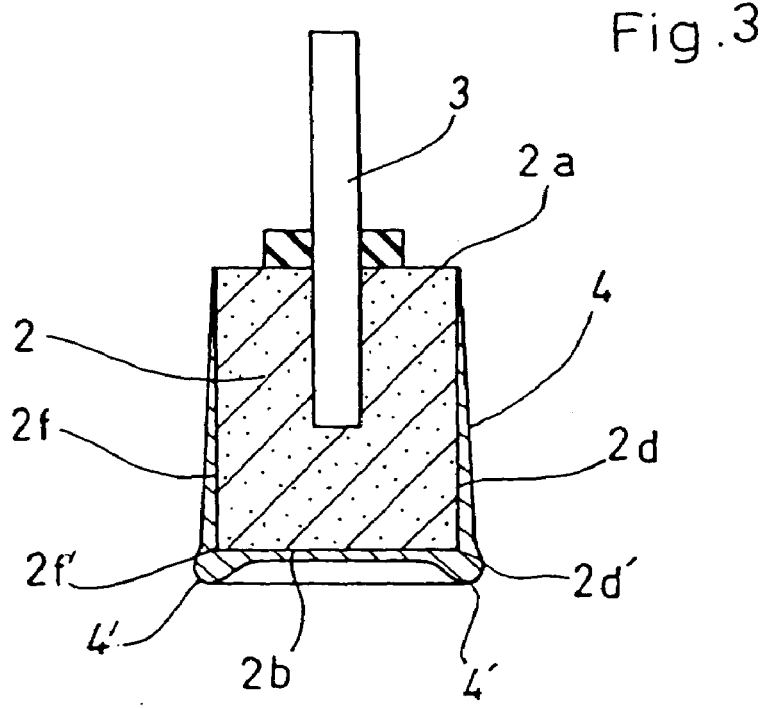
FIG. 3 is a sectional view taken along lines III—III in FIG. 2.
Figure 4:
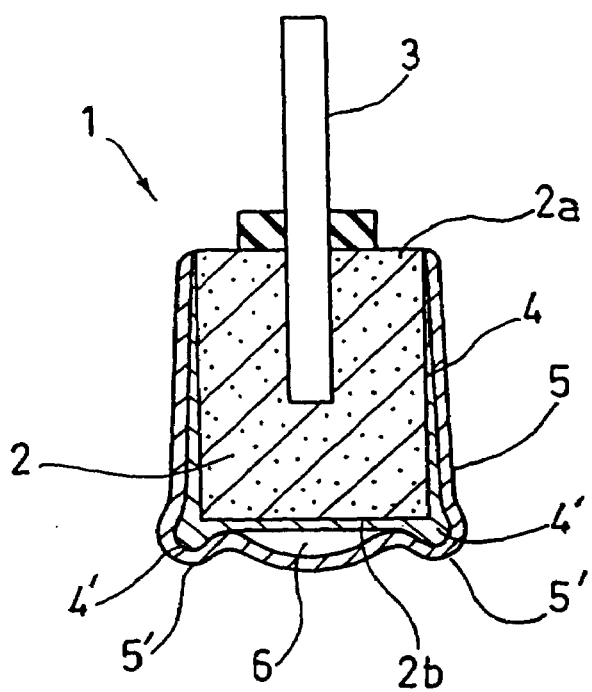
FIG. 4 is a longitudinal sectional view showing the prior art capacitor element.
Figure 9:
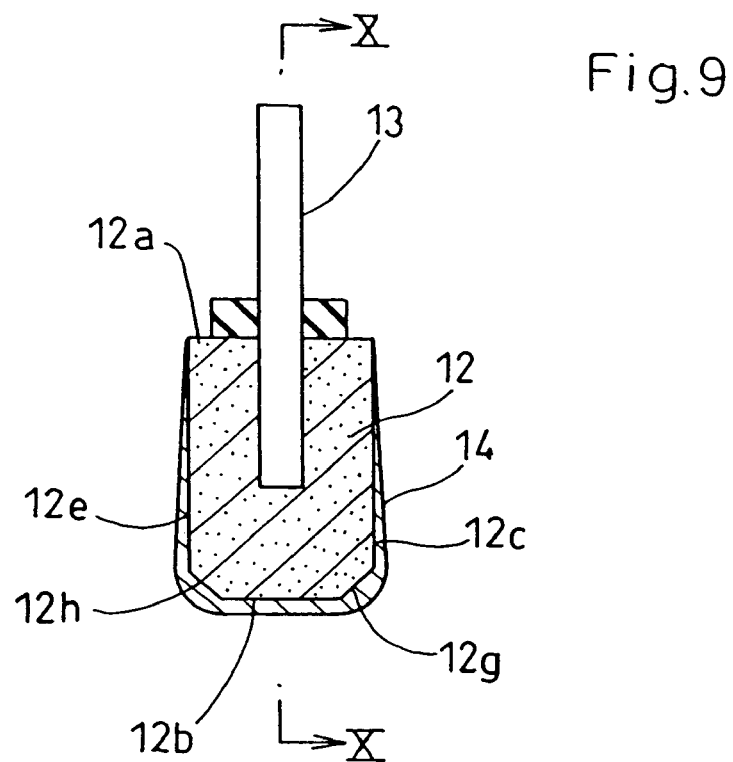
FIG. 9 is a longitudinal sectional view showing the anode chip body formed with a solid electrolyte layer according to the present invention.
Figure 10:
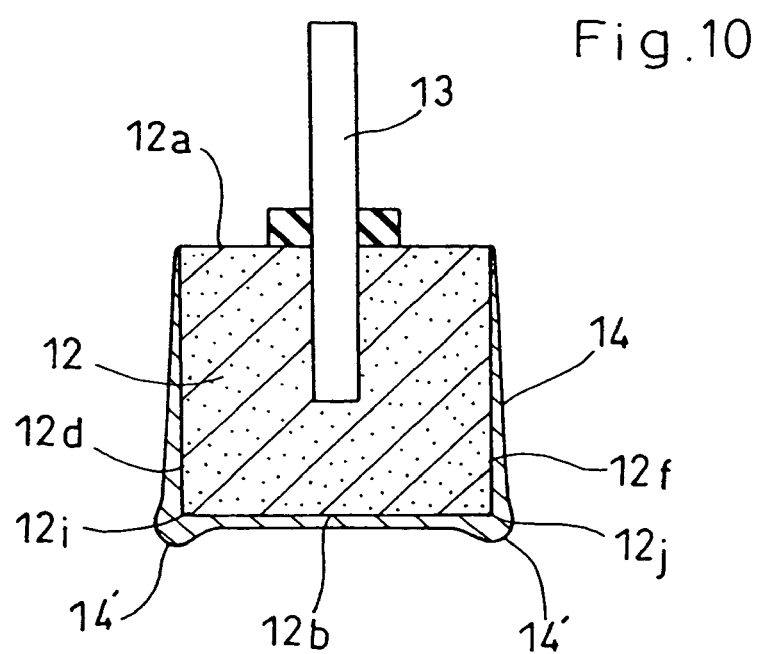
FIG. 10 is a sectional view taken along lines X—X in FIG. 9.

Subsequently, similarly to the case shown in FIG. 1, the anode chip body 12, with the anode wire 13 oriented upward, is immersed in an electrolyte solution such as an aqueous solution of manganese nitrate so that the electrolyte solution infiltrates into the porous structure in the anode chip body 12. Thereafter, the anode chip body 12 pulled out from the electrolyte solution is dried and baked. These process steps are repeated a plurality of times. As a result, as shown in FIGS. 9 and 10, a solid electrolyte layer 14 made of metal oxide such as manganese dioxide is formed on the anode chip body 12 via the dielectric film.

In the above step for forming the solid electrolyte layer 14 on the anode chip body 12 via the dielectric film, when the anode chip body 14 is pulled out from the electrolyte solution, the electrolyte solution dripping from the second, or the lower end surface 12b of the anode chip body 12 gathers to form droplets only at the two ridge lines, i.e. the two corner edges 12i and 12j where the opposite pair of smaller side surfaces 12d and 12f of the four side surfaces 12c, 12d, 12e and 12f of the anode chip body 12 meet the second end surface 12b. The electrolyte solution does not gather to form droplets at the two beveled surfaces 12g, 12h or rounded surfaces 12g', 12h'.

Therefore, of the four edges surrounding the second end surface 12b, only the corner edges 12i and 12j which are not chamfered or rounded unlike the surfaces 12g, 12g or the surfaces 12g', 12h' are formed with bumps 14' of the electrolyte layer 14. In this way, at the second end surface 12b of the anode chip body 12, the electrolyte layer 14 is prevented from being surrounded by the outwardly projecting bumps 14' along the entire periphery of the end surface.

Figure 11:
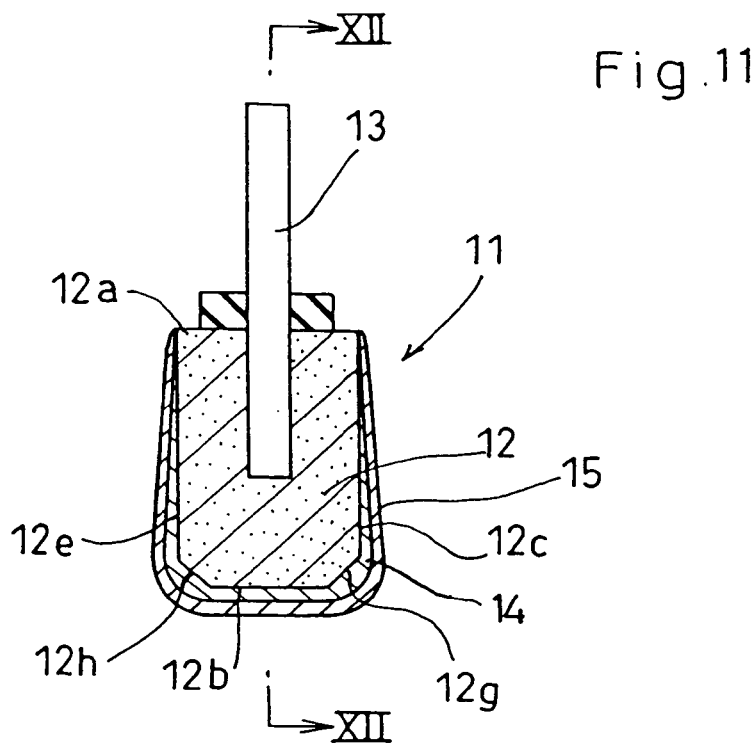
FIG. 11 is a longitudinal sectional view showing a capacitor element according to the present invention.
Figure 12:
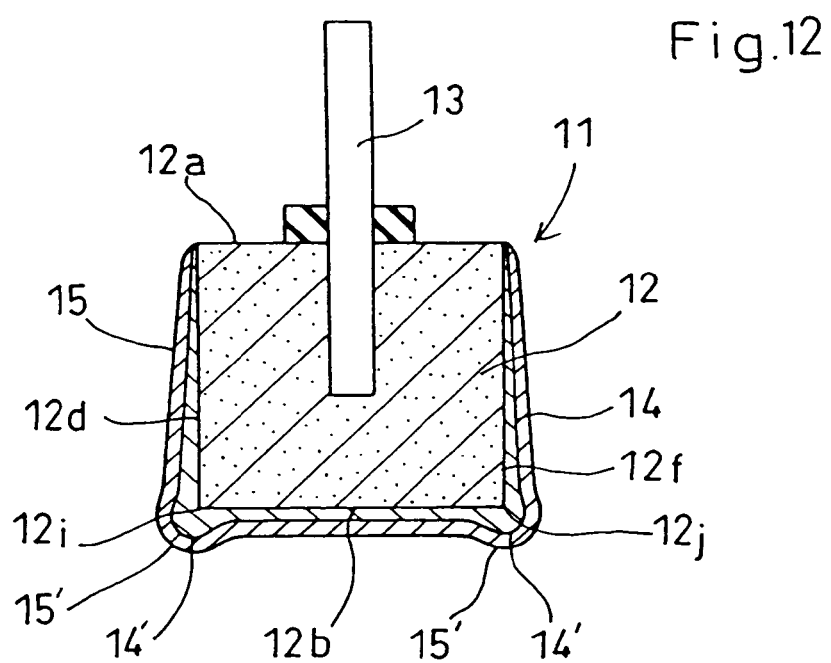
FIG. 12 is a sectional view taken along lines XII—XII in FIG. 11.

Subsequently, after a graphite layer as an underlying layer is formed on the anode chip body 12, the anode chip body 12 is immersed in a metal paste such as a silver paste with the anode wire 13 oriented upward and then pulled out and baked. As a result, as shown in FIGS. 11 and 12, a cathode-side electrode film 15 of the metal paste is formed on the surfaces of the anode chip body 12 except the first end surface 12a, whereby a capacitor element 11 is provided.

When the anode chip body 12 is immersed in the metal paste for forming the cathode-side electrode film 15, air at the second end surface 12b of the anode chip body 12 can easily escape so that trapping of air at that portion is unlikely to occur. Therefore, in forming the cathode-side electrode film 15 by using a metal paste such as a silver paste, the formation of a void due to the trapping of an air bubble can be prevented.

At the second end surface 12b of the anode chip body 12, the cathode electrode film 15 formed in the above manner bulges to become bumps 15' only at portions overlapping the outward bumps 14' of the solid electrolyte layer 14. Thus, of the four edges of the second end surface 12b, the cathode electrode film 15 is prevented from bulging to become bumps at the beveled surfaces 12g, 12h or the rounded surfaces 12g', 12h'.

The capacitor element 11 made in the above manner is assembled into a package-type solid electrolytic capacitor 100 in the following manner.

Figure 13:
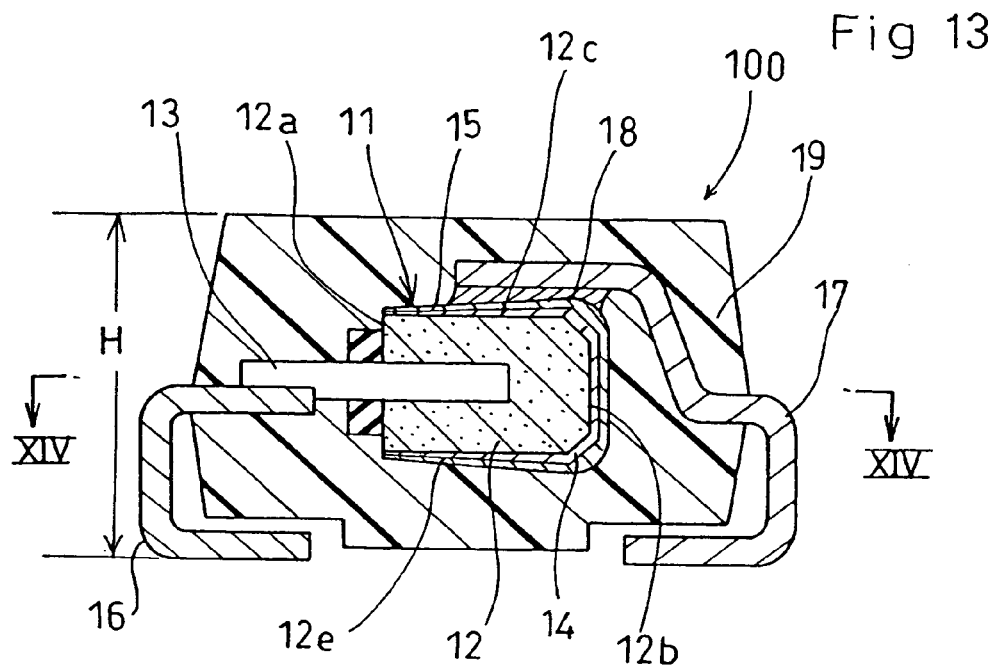
FIG. 13 is a longitudinal sectional view showing a solid electrolytic capacitor made by using the capacitor element according to the present invention.
Figure 14:
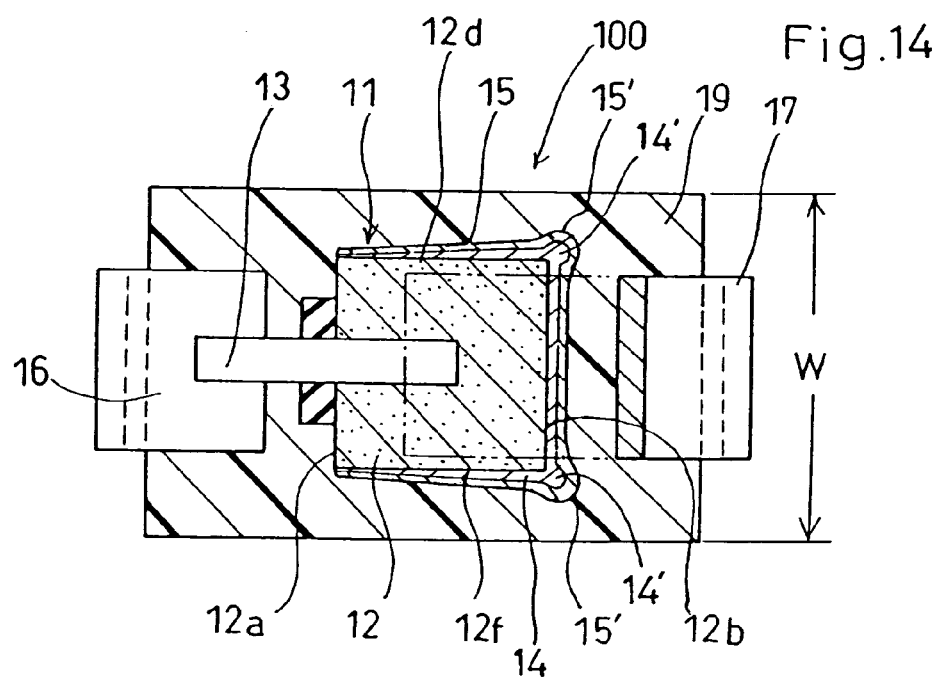
FIG. 14 is a sectional view taken along lines XIV—XIV in FIG. 13.

As shown in FIGS. 13 and 14, the capacitor element 11 is placed between a pair of lead terminal plates 16 and 17 so that a parallel pair of larger side surfaces 12c, 12e of the four side surfaces 12c, 12d, 12e, 12f of the anode chip body 12 extend in parallel or generally in parallel with obverse surfaces of the lead terminal plates 16, 17. The anode wire 13 of the capacitor element 11 is bonded to the anode-side lead terminal plate 16 by e.g. welding, whereas the cathode-side lead terminal 17 is electrically connected directly to the cathode-side electrode film 15 of the capacitor element 11 using a conductive paste 18, for example. Subsequently, the entirety is hermetically sealed in a package 19, whereby a package-type solid electrolytic capacitor 100 is provided.

In this structure, the outward bumps 14', 15' of the solid electrolyte layer 14 and the cathode-side electrode film 15 formed at the second end surface 12b of the anode chip body 12 do not project from the side surfaces 12c and 12e which, of the four side surfaces 12c, 12d, 12e and 12f of the anode chip body, become an upper surface and a lower surface, respectively, when the anode chip body is assembled into the capacitor. Therefore, the height H of the package-type solid electrolytic capacitor 100 can be reduced by as much as the dimension of the bumps 14', 15' which do not project from the surfaces 12c, 12e, whereby the size and weight of the capacitor can be reduced.

Since the bumps 14' and 15' do not project from the side surfaces 12c and 12e, the bumps 14' and 15' do not come into contact with the cathode-side lead terminal plate 17. Therefore, in assembling the solid electrolytic capacitor, damage to the bumps 14' and 15' such as chipping off of the bumps can be avoided, and the cathode-side electrode film 15 can be electrically connected to the cathode-side lead terminal plate 17 reliably.

In assembling the solid electrolytic capacitor, the capacitor element 11 may be placed so that, of the four side surfaces 12c, 12d, 12e and 12f of the anode chip body 12, the side surfaces 12d and 12f, which are not formed into beveled surfaces 12g, 12h or rounded surfaces 12g', 12h' at the edges meeting the second end surface 12b, become parallel or generally parallel with the obverse surfaces of the lead terminal plates 16 and 17. In such a case, the width W of the solid electrolytic capacitor 100 can be reduced.

The invention claimed is:

1. A capacitor element comprising:
 a chip body including a porous sintered body formed by sintering valve metal powder into a rectangular parallelepiped having first to fourth side surfaces, a first end surface and a second end surface which is opposite from the first end surface, and an anode wire projecting from the first end surface, the first and third surfaces being opposite to each other, the second and fourth surfaces being opposite to each other;

a dielectric film formed on the metal powder of the chip body;

a solid electrolyte layer formed on the dielectric film to cover the second end surface and the first to fourth side surfaces of the chin body; and a cathode-side electrode film formed on the chip body via the solid electrolyte film;

wherein the first side surface is connected to the second end surface via a first beveled or rounded surface, the third side surface is connected to the second end surface via a second beveled or rounded surface, the second side surface meeting the second end surface along a first edge line, the fourth side surface meeting the second end surface along a second edge line, the solid electrolyte film and the cathode-side electrode film bulging to a greater extent along the first and second edge lines than along the first and second beveled or round surfaces.

2. A method of making a capacitor element of a solid electrolytic capacitor, comprising the steps of:

preparing a chip body including a porous sintered body formed by sintering valve metal powder into a rectangular parallelepiped having first to fourth side surfaces, a first end surface and a second end surface which is opposite from the first end surface, and an anode wire projecting from the first end surface, the first and third surfaces being opposite to each other, the second and fourth surfaces being opposite to each other, the first side surface being connected to the second end surface via a first beveled or rounded surface, the third side surface is connected to the second end surface via a second beveled or rounded surface, the second side surface meeting the second end surface along a first edge line, the fourth side surface meeting the second end surface along a second edge line;

forming a dielectric film on the metal powder of the chip body;

forming a solid electrolyte layer to cover the second end surface and the first to fourth side surfaces of the chip body by immersing the chip body in an electrolyte solution with the anode wire oriented upward and pulling the chip body from the solution followed by baking the chip body; and forming a cathode-side electrode film of a metal paste on the chip body via the solid electrolyte layer;

wherein the formation of the solid electrolyte film and the cathode-side electrode film is performed in a manner such that the solid electrolyte film and the cathode-side electrode film bulge to a greater extent along the first and second edge lines than along the first and second beveled or round surfaces.

3. A solid electrolytic capacitor comprising:

an anode lead terminal plate, a cathode lead terminal plate, and a capacitor element arranged between the anode lead terminal plate and the cathode lead terminal plate;

the capacitor element comprising a chip body including a porous sintered body formed by sintering valve metal powder into a rectangular parallelepiped having first to fourth side surfaces, a first end surface and a second end surface which is opposite from the first end surface, and an anode wire projecting from the first end surface, a dielectric film formed on the metal powder of the chip body, a solid electrolyte layer formed on the dielectric film to cover the second end surface and the first to fourth side surfaces of the anode chip body, and a cathode-side electrode film formed on the chip body via the solid electrolyte film, the first and third surfaces being opposite to each other, the second and fourth surfaces being opposite to each other;

the anode wire of the capacitor element being fixed to the anode lead terminal plate, the cathode-side electrode film being electrically connected to the cathode lead terminal plate;

wherein the first side surface being connected to the second end surface via a first beveled or rounded surface, the third side surface is connected to the second end surface via a second beveled or rounded surface, the second side surface meeting the second end surface along a first edge line, the fourth side surface meeting the second end surface along a second edge line, the solid electrolyte film and the cathode-side electrode film bulging to a greater extent along the first and second edge lines than along the first and second beveled or round surfaces.

4. The solid electrolytic capacitor according to claim 3, wherein the cathode lead terminal is connected to the cathode-side electrode film on the first side surface of the chin body.

* * * * *